United States Patent
Ahn et al.

(10) Patent No.: US 6,839,774 B1
(45) Date of Patent: Jan. 4, 2005

(54) SINGLE-CHIP DATA PROCESSING APPARATUS INCORPORATING AN ELECTRICALLY REWRITABLE NONVOLATILE MEMORY AND METHOD OF OPERATING THE SAME

(75) Inventors: Jong-Keun Ahn, Seoul (KR); Bum-Seok Yu, Seoul (KR); Sang-Joo Ra, Seoul (KR); Jong-In Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 09/693,773

(22) Filed: Oct. 20, 2000

(30) Foreign Application Priority Data

Oct. 21, 1999 (KR) ........................................ 1999-45785
Oct. 19, 2000 (KR) ........................................ 2000-61457

(51) Int. Cl.[7] .............................................. G06F 3/00
(52) U.S. Cl. ................................. 710/14; 710/5; 710/8; 710/10; 710/104; 713/1; 713/100; 713/320
(58) Field of Search ........................... 710/8, 10, 5, 14, 710/22, 104; 713/1, 100, 320

(56) References Cited

U.S. PATENT DOCUMENTS

| | | | |
|---|---|---|---|
| 5,398,208 A | | 3/1995 | Sakamoto |
| 5,493,534 A | | 2/1996 | Mok |
| 5,835,706 A | * | 11/1998 | Hikichi et al. ................. 714/49 |
| 5,872,994 A | | 2/1999 | Akiyama et al. |
| 5,950,222 A | * | 9/1999 | Yamada et al. ............. 711/103 |
| 6,032,221 A | * | 2/2000 | Hongo ........................ 711/103 |
| 6,032,237 A | * | 2/2000 | Inoue et al. ................. 711/163 |
| 6,201,733 B1 | * | 3/2001 | Hiraki et al. .......... 365/185.08 |
| 6,226,724 B1 | * | 5/2001 | Biggs ......................... 711/170 |
| 6,493,271 B2 | * | 12/2002 | Matsubara et al. .... 365/185.33 |
| 6,516,366 B1 | * | 2/2003 | Gates et al. ................. 710/105 |

* cited by examiner

*Primary Examiner*—Fritz Fleming
*Assistant Examiner*—Eron Sorrell
(74) *Attorney, Agent, or Firm*—F. Chau & Associates, LLC

(57) ABSTRACT

A microcontroller includes an electrically erasable and programmable nonvolatile memory and a memory controller for controlling the nonvolatile memory. Upon writing a control program for the microcontroller and data into the nonvolatile memory pursuant to an externally provided NVM command or an internally issued program command, a CPU of the microcontroller does not intervene in controlling the nonvolatile memory. Particularly, in a programming mode set by the external program command, CPU, buses, and communication interfaces of the microcontroller are deactivated. Further, the memory controller receives a NVM command, an address and data from outside of the microcontroller for controlling an operation of the nonvolatile memory based on the NVM command and the address without intervention of the CPU.

23 Claims, 8 Drawing Sheets

Fig. 5

User Programming Control Register

| | | | FAST | ACC2 | ACC1 | ACC0 | SDPD | | STRSTP | SPGM | OSPGM | SERS | OSERS |
|---|---|---|---|---|---|---|---|---|---|---|---|---|---|

FAST      : Memory Interleaved Mode For High Speed
ACC[2:0]  : Memory Access Cycle
SDPD      : Software Data Protection Disable
STRSTP    : Operation Start/Stop#
SPGM      : Sector Program Enable
OSPGM     : Option Sector(Smart Option/Protection) Program Enable
SERS      : Sector Erase Enable
OSERS     : Option Sector(Smart Option/Protection) Sector Erase Enable

Fig. 6

User Programming Error Register

| CFGERR | RGMERR | VTGERR | | | | | |
|--------|--------|--------|--|--|--|--|--|

CFGERR : Configuration Error
PGMERR : Program Error
VTGERR : Votage Error

Fig. 7

Sector Protection Flag Register

| U7 | U6 | U5 | U4 | U3 | U2 | U1 | | | | | | | | | |
|----|----|----|----|----|----|----|---|---|---|---|---|---|---|---|---|
| LF | LE | LD | LC | LB | LA | L9 | L8 | L7 | L6 | L5 | L4 | L3 | L2 | L1 | L0 |

U1 : 08000h-0ffffh 32Kbyte
U2 : 10000h-17fffh 32Kbyte
U3 : 18000h-1ffffh 32Kbyte
U4 : 20000h-27fffh 32Kbyte
U5 : 28000h-2ffffh 32Kbyte
U6 : 30000h-37fffh 32Kbyte
U7 : 38000h-3ffffh 32Kbyte L0 : 00000h-007FFh 2Kbyte
L1 : 00800h-00fffh 2Kbyte
L2 : 01000h-017ffh 2Kbyte
L3 : 01800h-01fffh 2Kbyte
L4 : 02000h-027ffh 2Kbyte
L5 : 02800h-02fffh 2Kbyte
L6 : 03000h-037ffh 2Kbyte
L7 : 03800h-03fffh 2Kbyte
L8 : 04000h-047FFh 2Kbyte
L9 : 04800h-04fffh 2Kbyte
LA : 05000h-057ffh 2Kbyte
LB : 05800h-05fffh 2Kbyte
LC : 06000h-067ffh 2Kbyte
LD : 06800h-06fffh 2Kbyte
LE : 07000h-07fffh 2Kbyte
LF : 07800h-07fffh 2Kbyte

US 6,839,774 B1

SINGLE-CHIP DATA PROCESSING APPARATUS INCORPORATING AN ELECTRICALLY REWRITABLE NONVOLATILE MEMORY AND METHOD OF OPERATING THE SAME

CROSS-REFERENCE TO RELATED APPLICATIONS

This application claims foreign priority to Korean Patent Application Numbers 1999-45785, filed on Oct. 21, 1999; and 2000-61457, filed on Oct. 19, 2000.

BACKGROUND OF THE INVENTION

1. Field of the Invention

The present invention relates to an integrated circuit data processing apparatus and, more particularly, to a data processing apparatus having an embedded electrically rewritable nonvolatile semiconductor memory.

The present invention further relates to methods of operating an integrated circuit data processing apparatus having an embedded electrically rewritable nonvolatile semiconductor memory.

2. Description of the Related Art

The use of VLSI chip circuitry in digital data processing systems, or computers, has realized the benefits of smaller size, lighter weight, lower cost, reduced power requirements, and higher reliability. VLSI circuitry such as single-chip computers (i.e., microcontrollers or microcontrollers) allow computer electronics to be used in almost all of today's homes and commercial/industrial applications.

A control or application software program for operating a microcontroller is stored typically in a read-only memory (ROM), such as a mask ROM, an erasable and programmable ROM (EPROM), an electrically erasable and programmable ROM (EEPROM), or a flash EEPROM. It is generally known that once stored, the contents of a built-in mask ROM cannot be altered. Thus, a program stored in mask ROM cannot be reprogrammed. In contrast, a microcontroller with an embedded EPROM, an EEPROM, or a flash EEPROM can be wholly rewritten or partially updated when control program thereof needs to be changed.

Presently, microcontrollers incorporating flash memories have been widely used in a variety of applications, such as portable phones, caller ID boxes, CD-ROM drivers, DVD players, smart cards, and set-top boxes. Such microcontrollers with a built-in flash memory can be programmed while they are mounted on a printed circuit board of a system, i.e., in an "on-board" state.

A typical microcontroller may include a central processing unit (CPU), an embedded flash EEPROM for storing a control program for CPU, a ROM for storing a writing program for writing the control program into the flash memory, a random access memory (RAM) for storing temporary data, sand a mode control unit for setting various modes of operations of the microcontroller.

For example, a prior art flash memory incorporated microcontroller is described in U.S. Pat. No. 5,872,994 to Akiyama et al. In an on-board writing operation mode of the prior art microcontroller, a control program source is connected via an adapter to a serial communication interface or to an input/output port. When a mode control unit recognizes an on-board writing operation mode by the data signal at a data bus supplied from the input/output port or the like, the mode control unit connects the serial communication interface, flash memory, RAM and CPU to buses. In this mode, the CPU reads the control program via the serial communication interface from the control program source in accordance with the writing program stored in the ROM, and temporarily stores the control program into the RAM.

However, the ROM of the prior art microcontroller is active only for an on-board writing mode; that is, the ROM is inactive for the other operation modes. Accordingly, incorporating such a ROM into a microcontroller chip limits the chip size reduction advantage of the microcontroller. The prior art also offers an alternative on-board writing method by using a RAM to store a writing program instead of using a ROM. This method reduces the size of the microcontroller since the ROM is no longer needed for storing a writing program, but a RAM is still needed as an essential element.

In addition, the prior art microcontroller includes a data reception time detector that detects the read speed of a program supplied from a program source by monitoring the system clock speed during an on-board writing operation. When the read speed is high, the CPU temporarily stores the program in the RAM or a buffer of the CPU before writing the program into the flash memory. On the other hand, when the read speed is low, the CPU directly writes the program into the flash memory. Further, the prior art microcontroller can vary a writing operation time period or a flash erasing operation time period. These features, however, tend to add to the cost and circuit complexity of the microcontroller.

Other examples of flash memory incorporated microcontrollers are described in U.S. Pat. Nos. 5,398,208 to Sakamoto and 5,493,534 to Mok. Each of these patents is incorporated by reference herein as providing a description of the prior art.

SUMMARY OF THE INVENTION

A general object of the present invention is to provide an on-board programmable microcontroller that achieves a smaller chip size and a lower cost.

It is another object of the present invention to provide a microcontroller capable of performing an on-board programming operation without any other memories other than an electrically erasable and programmable nonvolatile semiconductor memory (EEP-NVM) for storing a control program set and data.

It is yet another object of the present invention to provide a microcontroller with an embedded nonvolatile semiconductor memory, which guarantees the embedded nonvolatile memory to have a constant erase time and a constant program time independent of system environment.

It is yet another object of the present invention to provide an on-board programming architecture applicable to low-end microcontrollers without any buffer memories.

It is yet another object of the present invention to provide a new method for operating a microcontroller incorporating an EEP-NVM.

Typical features of the present invention disclosed in the present application will be briefly explained below.

According to a preferred aspect of the present invention, an on-board programmable microcontroller incorporates an EEP-NVM and an NVM controller for controlling the EEP-NVM.

In a tool mode of operation, a central processing unit (CPU), buses, and communication interfaces in the microcontroller are deactivated. And, the NVM controller receives a command, a data and an address from a serial I/O port connected to the NVM controller and controls an internal operation (e.g., a read, write, or erase operation) of the EEP-NVM based on the command and the address without intervention of the CPU.

In a user programming mode, the CPU receives a command, data and an address from the communication interfaces and send the received data and address to the NVM controller. The received command is stored in the CPU until it is decoded and the CPU writes a control word into a control register of the NVM controller to set an internal operation mode.

According to another preferred aspect of the present invention, a microcontroller comprises a CPU, a plurality of buses, a mode controller, one or more communication interfaces, an EEP-NVM, an NVM controller and a serial I/O port connected to the NVM controller. The CPU, EEP-NVM, communication interfaces, and NVM controller are connected to the plurality of buses. The mode controller sets the programming modes of the microcontroller in response to mode select signals. The programming modes include tool mode and user programming mode.

The NVM controller includes latch or register circuits for storing commands, addresses, and data (such as a control program set for the microcontroller). When a received command is a write command, the NVM controller directly writes at least a portion of the received data into the EEP-NVM, based on a received address. An EEPROM or a flash EEPROM is preferably used for the EEP-NVM. Alternatively, a ferroelectric RAM may also be used as the EEP-NVM.

According to still another preferred aspect of the present invention, there is provided a method for programming a microcontroller which includes a serial I/O port for a serial I/O operation; a communication interface for communicating serially or in parallel with external devices, such as synchronous SIO, UART, I²C bus, USB or parallel interface; a CPU; an EEP-NVM; an NVM controller for controlling the EEP-NVM; a buffer memory; a bus for selectively connecting communication interfaces, EEP-NVM, NVM controller and buffer memory to one another; and a mode controller for setting various operation modes and test modes in the microcontroller.

The mode controller sets one of the programming modes or test modes of the microcontroller in response to the mode select signals, preferably supplied from an input port connected to the mode controller.

If the mode select signal is a first programming mode(tool mode) the mode controller deactivates the CPU and the communication interface. In this mode, a set of command, address and data is provided in serial to the NVM controller through the serial I/O port.

A second programming mode (user programming mode) is set by a mode setting command issued from an external control program source device such as a ROM writer or a host computer. In this second programming mode, the mode controller deactivates the serial I/O port which is connected to the NVM controller, the CPU receives an internal operation command through the communication interface to decode the internal operation command. Thereafter, the CPU sets control bits in the NVM controller in response to the decoded internal operation command. If the decoded internal operation command indicates either one of a read or an erase operation, the CPU routes an address from the communication interface to the NVM controller. If the decoded internal operation command indicates a write operation, the CPU routes addresses and data from the communication interface to the NVM controller. Thereafter, the NVM controller halts the CPU until a write operation of the EEP-NVM is completed.

BRIEF DESCRIPTION OF THE DRAWINGS

The above and various other features and advantages of the present invention will be readily understood with reference to the following detailed description taken in conjunction with accompanying drawings, in which like reference numerals designate like structural elements, and, in which:

FIGS. 4 through 7 are views illustrating key registers, a user programming control register, a user programming error register, and a sector protection flag register within the memory controller of FIG. 1, respectively.

DETAILED DESCRIPTION OF PREFERRED EMBODIMENTS OF THE INVENTION

In the following description and drawings, well-known element structures, circuit blocks, and architectural functions will not be described in detail in order to avoid obscuring the invention. And, for the most part, details concerning timing considerations will be omitted in as much as such details are not necessary to obtain a complete understanding of the present invention and are within the skills of persons of ordinary skill in the relevant art.

The present invention will now be described more fully hereinafter with reference to the accompanying drawings of FIGS. 1 through 8.

Figure 1:
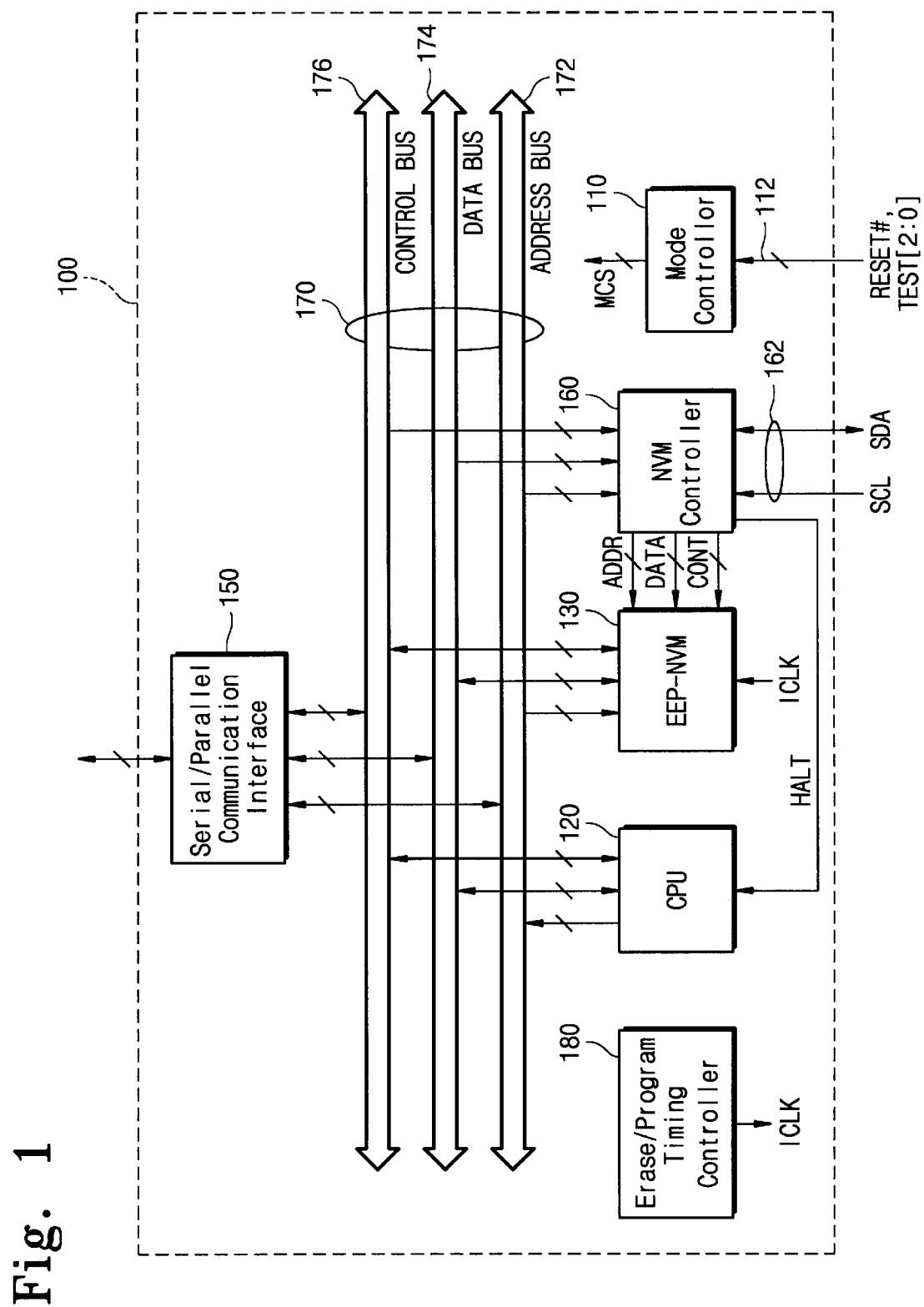
FIG. 1 is a block circuit diagram illustrating an embodiment of a microcontroller according to the present invention.

FIG. 1 illustrates a microcontroller 100 according to a first embodiment of the present invention. With reference to FIG. 1, the microcontroller 100 is a single chip data processing apparatus of, e.g., 32 bits. The microcontroller 100 comprises a mode controller 110, a central processing unit (CPU) 120, and an electrically erasable and programmable nonvolatile semiconductor memory (EEP-NVM) 130, such as a EEPROM or a flash EEPROM, used as a program memory of the microcontroller 100. The CPU 120 and the EEP-NVM 130 are connected to buses 170 including an address bus 172, a data bus 174 (e.g., of 32 bits), and a control bus 176.

The mode controller 110 receives mode select signals RESET#, TEST0, TEST1 and TEST2 applied from outside of the microcontroller 100 via an input port 112, and generates mode control signals MCS for setting various operation modes in each section of the microcontroller 100. Preferably, MCS is derived from a logical combination of the mode select signals RESET# and TEST0–TEST2. The operational modes of the microcontroller 100 include a "tool" mode (a first programming mode), a "user programming" mode (a second programming mode), a plurality of test modes, and so on. The microcontroller 100 further comprises one or more bit-programmable communication interfaces 150 including at least one serial interface and/or at least one parallel interface. Exemplary communication interfaces applicable to the present invention include synchronous SIO, UART, I²C bus, and USB. The communication interface 150 is selectively coupled to internal buses 170 in response to the mode control signals MCS from the mode controller 110, the internal mode setting signals, or the mode setting command. It is readily apparent to one skilled in the art that the communication interface 150 may include I/O ports which may be bit programmable. Alternatively, I/O ports additional to communication interfaces may be used by the microcontroller 100 to interface external communication devices. CPU 120 controls EEP-NVM 130, and communication interfaces 150 in accordance with the operation modes of the microcontroller 100.

Figure 2:
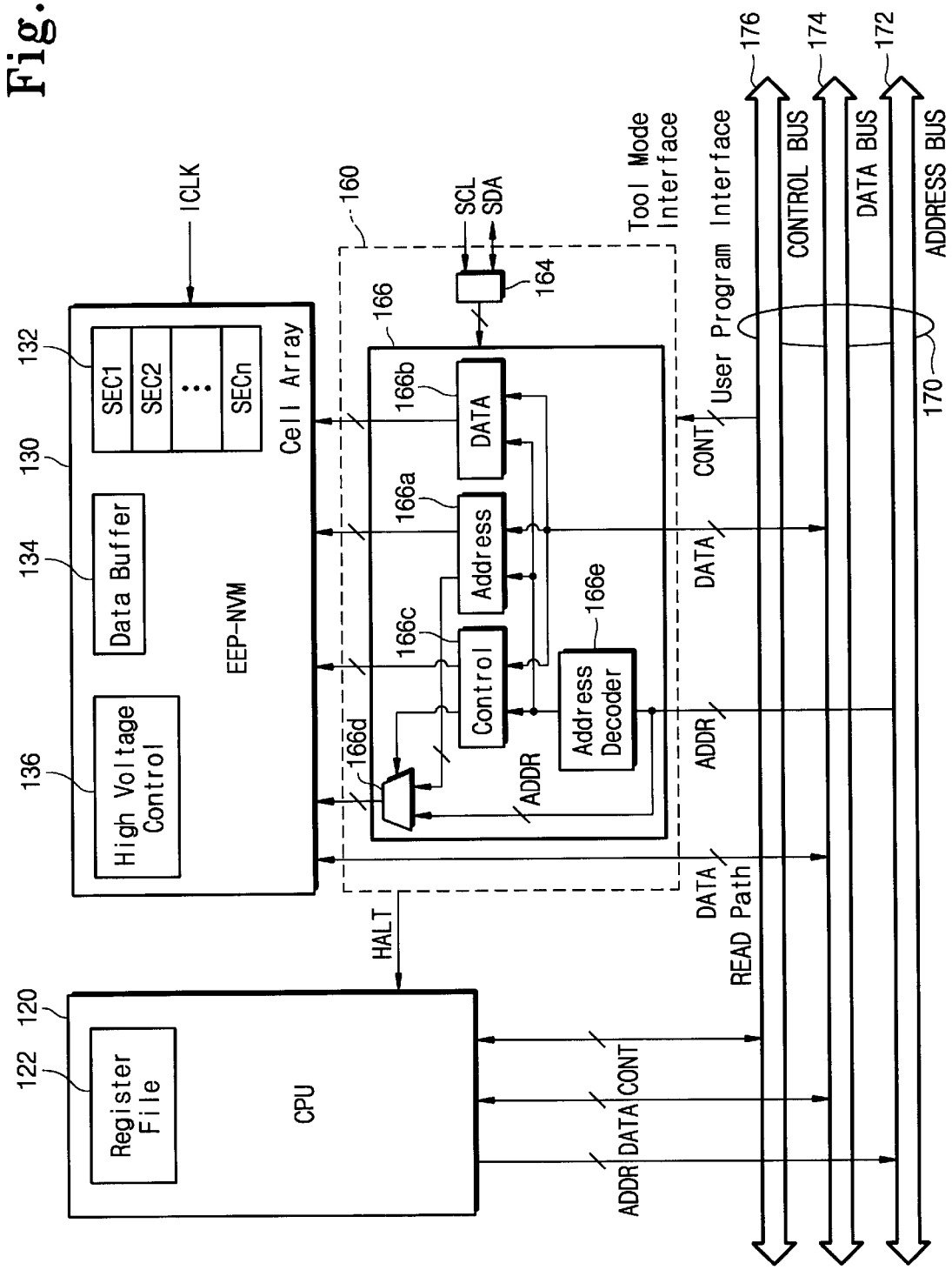
FIG. 2 is a block circuit diagram of major components of the microcontroller of FIG. 1.

The microcontroller 100 is additionally provided with an NVM controller 160 including a serial interface (see 164 of FIG. 2) and a parallel interface (see 166 of FIG. 2). The serial interface of the NVM controller 160 includes a serial port 162 which has a clock input pin SCL and a serial data I/O pin SDA. Here, note that the serial port 162 may additionally include several other pins, for example, a power supply ($V_{DD}$) pin, a ground ($V_{SS}$) pin, test pins and some reserved pins in other versions of the invention.

In the tool mode where the microcontroller 100 is programmed with a set of control programs to control the microcontroller 100, the NVM controller 160 receives a set of mode command, data and address from the outside of the microcontroller 100 via the data I/O pin SDA and directly controls operations of the EEP-NVM 130 based on the command and the address without intervention of CPU 120.

In such a serial programming mode of the microcontroller 100, the NVM controller 160 arranges the serial data in a parallel data format including a command field (e.g., 4 bits), an address field (e.g., 20 bits) and a data field, and provides address ADDR and data DATA in parallel to the EEP-NVM 130, along with several control signals CONT. Thereafter, the NVM controller 160 controls a write operation of the EEP-NVM 130 based on the write command and the address. At the completion of the above programming, the EEP-NVM 130 can be used as a boot memory of the microcontroller 100.

As is described above, the microcontroller of the invention is capable of performing an onboard programming operation without any other memories such as ROM and/or RAM other than the EEP-NVM 130, thereby achieving a lower chip size and cost.

Other operation modes, for example, user programming mode corresponding to a write mode of the EEP-NVM 130, microcontroller test modes, and other EEP-NVM's operation modes (e.g., erase and read modes), are set by a mode setting command issued from an external control program source device such as a ROM writer or a host computer. In this second programming mode, the mode controller 110 deactivates the serial I/O port 162 which is connected to the NVM controller 160, the CPU 120 receives an internal operation command through the communication interface 150 to decode the internal operation command. Thereafter, the CPU 120 sets control bits in the NVM controller 160 in response to the decoded internal operation command. If the decoded internal operation command indicates a read or an erase operation, the CPU 120 retrieves the affected address from the communication interface 150 and sends it to the NVM controller 160. If the decoded internal operation command indicates a write operation, the CPU 120 sends the affected address and data from the communication interface 150 to the NVM controller 160. Thereafter, the NVM controller 160 halts the CPU 120 until a write operation of the EEP-NVM 130 is completed.

When an EEPROM or a flash EEPROM is used as the EEP-NVM 130, the microcontroller 100 preferably includes an erase and program timing controller 180. This controller 180 allows the EEPROM or the flash memory to be erased or programmed at a constant erase or program speed irrespective of environments of a system to which the microcontroller 100 of the invention is applied. The program and erase timing controller 180 contains a clock generator (note shown) that generates an erase and/or program sync clock signal ICLK at a constant frequency. ICLK is provided to clock the EEPROM or the flash memory. As a result, the EEPROM or the flash memory can be erased or programmed at a constant speed independent of a main system clock signal which is externally applied to the microcontroller 100, thereby eliminating overerasure and write disturbance problems of the EEPROM or the flash memory.

FIG. 2 is a block diagram showing examplary interconnects of the CPU 120, EEP-NVM 130, and NVM controller 160. The EEP-NVM 130 has a nonvolatile memory cell array 132, such as an EEPROM cell array, a flash memory cell array or a ferroelectric memory cell array. The EEP-NVM 130 further includes a data buffer 134 for temporarily storing data during a long write time for, e.g., EEPROMs or flash memories. For the same purpose, the CPU 120 also may contain a register file 122.

In the event an EEPROM or a flash memory is used for the EEP-NVM 130, the EEP-NVM 130 includes high voltage control circuitry 136, such as charge pump circuitry, for its program and erase operations. Further, a memory cell array of the EEPROM or flash memory is divided into multiple sectors SEC1, SEC2, . . . , SECn and is equipped with erase inhibition function and/or write inhibition function for respective individual sectors, so that the EEPROM or flash memory can detect erase- and/or program-inhibited sectors and prevent false erasing and/or writing of the erase- and/or write-inhibited cell sectors. These functions will be described in further detail below.

The NVM controller 160 includes a serial interface 164 and a memory interface circuit 166. The serial interface 164 is provided for interfacing components outside of the microcontroller 100 in the tool mode. The memory interface circuit 166 contains an address register 166a, a data register 166b, control register circuitry 166c, and an address selector 166d.

The address register 166a, the data register 166b and the control register circuitry 166c are supplied with addresses, data and commands, respectively from the serial interface 164 in the tool mode. And, the address register 166a, the data register 166b and the control register circuitry 166c are also connected to the address bus 172, the data bus 174 and the control bus 176, respectively. In the user programming mode, however, the CPU 120 receives an internal operation command through the communication interface 150 to decode the internal operation command. Thereafter, the CPU 120 sets control bits in the control register circuitry 166c. If the decoded internal operation command indicates a read or an erase operation, the CPU 120 retrieves addresses from the communication interface 150 and deposits them in the address register 166a. If the decoded internal operation command indicates a write operation, the CPU 120 retrieves addresses and data from the communication interface 150 and deposits the addresses in the address register 166a and the data in the data register 166b through the address bus 172 and the data bus 174, respectively. Thereafter, the NVM controller 160 halts the CPU 120 until a write operation of the EEP-NVM 130 is completed.

The operation modes of the microcontroller 100 including tool mode, user programming mode and several test modes are set by a combination of the mode selection command signals RESET# and TEST0–TEST2, which are supplied from the input port 112 of mode controller 110.

In the tool mode, the mode controller 110 deactivates the CPU 120 and the communication interface 150 until other operation mode is issued. In the tool mode, the command, address and data are preferably provided in serial to the NVM controller 160 through serial I/O port 162. As a result, the microcontroller 100 is able to carry out an on-board programming of the EEP-NVM 130 without any other writing program storage, such as a ROM or a RAM. The NVM controller 160 directly writes a control program set (i.e., data) into the addressed area of the EEP-NVM 130 according to the received address. The EEP-NVM 130, thus programmed, can be employed as the boot memory of the microcontroller 100. It will be readily apparent to those skilled in the art that such a control program set can be written into the EEP-NVM 130 in an off-board state of the microcontroller 100 by using a ROM writer, a host computer, or the like.

In the user programming mode, the mode controller 110 deactivates the serial I/O port 162. The CPU 120 reads a mode setting command from the communication interface 150 and preferably sets five (5) digits of the internal operation control bits of 166c by decoding the command. If the decoded internal operation command indicates either one of a read or an erase operation, the CPU 120 moves an address from the communication interface 150 to the address register 166a. If the decoded internal operation command indicates a write operation, the CPU moves an address and data from the communication interface 150 to the address register 166a and 166b, respectively. Thereafter the NVM controller 160 halts the CPU 120 until a write operation of the EEP-NVM 130 is completed.

Figure 3:
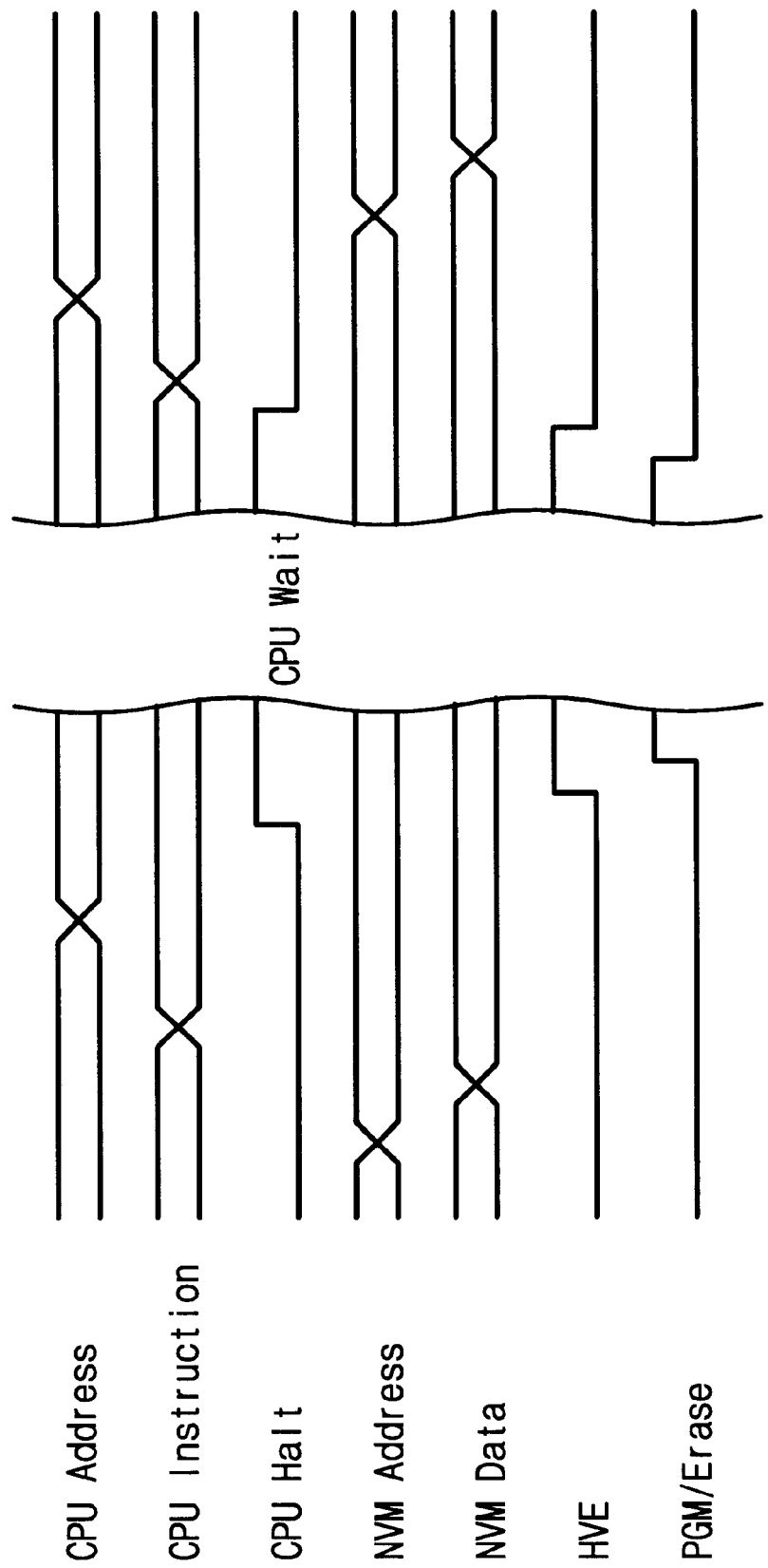
FIG. 3 is a timing diagram of a user programming mode of the microcontroller of FIG. 1.

In the user programming mode, CPU 120 issues a write command which indicates to the NVM controller 160 that the EEP-NVM 130 enters a write operation for an update program corresponding to a portion of the control program set stored in the EEP-NVM 130. The command is transferred to the EEP-NVM 130 through the NVM controller 160. The update program (i.e., a partial control program set) is provided to the NVM controller 160 from a device external to the microcontroller 100 via buses 170, and is used for updating the control program set stored in the EEP-NVM 130. The update program is also written into the EEP-NVM 130 while the microcontroller 100 is mounted on a board of a system. On the other hand, the NVM controller 160 halts the CPU 120 by generating a CPU hold signal HALT in response to the write command from the CPU 120. As shown in FIG. 3 which is a timing diagram of the user programming mode, a CPU wait signal halts CPU 120 processing while the update program is being written into the EEP-NVM 130. During this CPU wait period, both high voltage enable signal HVE and program/erase control signal PGM/Erase for EEPROMs and flash memories become active.

Figure 4:
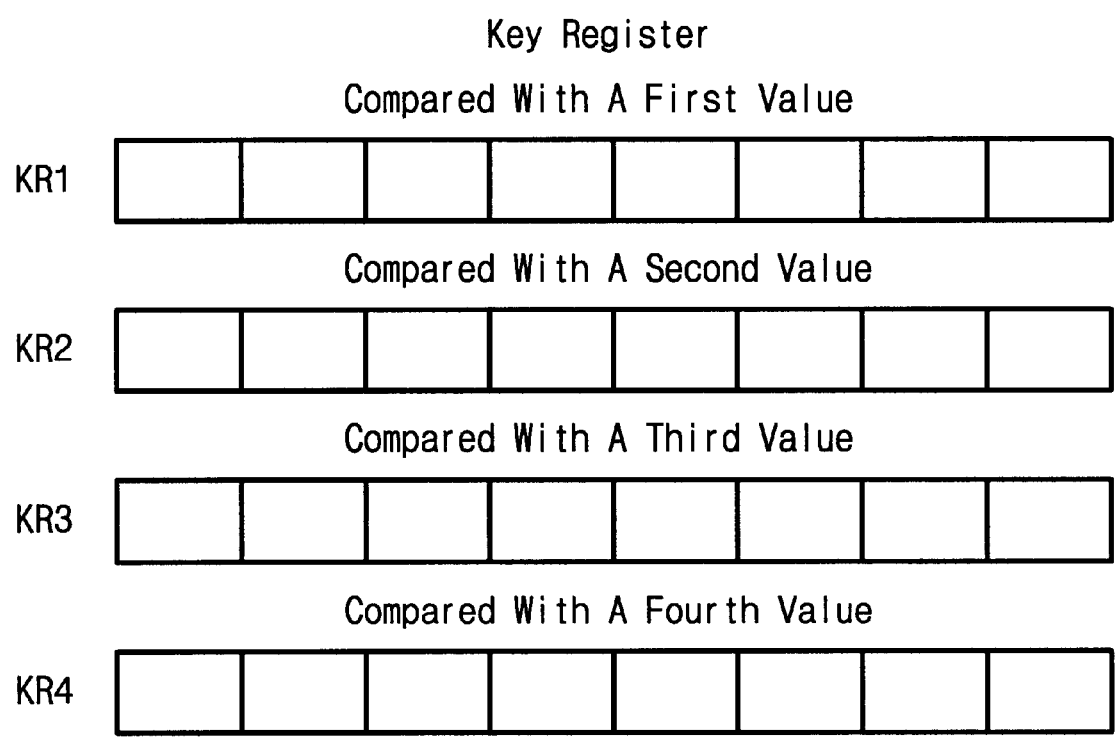

FIG. 4 illustrates key registers included in the NVM controller 160. Referring to FIG. 4, four 8-bit registers KR1–KR4 are provided. The key registers KR1–KR4 prevent the control registers within the NVM controller 160 from being accessed unless the first through the fourth predetermined key values are written into registers KR1–KR4, respectively. Namely, only when the registers KR1–KR4 contains the first through fourth key values, for example, '01011010' (=5A in hexadecimal), '10100101' (=A5 in hexadecimal), '01011010' and '10100101', respectively, can the registers in the control register circuit 166c be written.

FIG. 5 illustrates a format of a 16-bit user programming control register included in the NVM controller 160, which is bit-programmable. With reference to FIG. 5, the bit-programmable register includes a high speed bit FAST, access cycle bits ACC0–ACC2 for designating EEP-NVM access cycles, a software data protection disable bit SDPD, an operation start/stop bit STRSTP, a sector program enable bit SPGM, an option sector program enable bit OSPGM, a sector erase enable bit SERS for particularly EEPROMs, and an option sector erase enable bit OSERS for particularly EEPROMs. All the 16 bits of the bit-programmable register are initially set to logic 0.

When the high speed bit FAST is set to logic 1, the internal circuitry of the EEP-NVM 130 is configured for a high speed operation mode, such as an interleaved mode.

The access cycle bits ACC0–ACC2 designate EEP-NVM access cycles: for instance, '000' specifies 3 cycles, '001' 1 cycle, '010' 2 cycles, and '011' specifies 'Bank Disable'.

Configuring the user programming control register begins with setting the software data protection disable bit SPDP and one of the bits SPGM, OSPGM, SERS and OSERS to logic 1. Under this condition, the EEP-NVM 130 starts to operate when the bit STRSTP is set to logic 1. While the EEP-NVM 130 is operating, the CPU 120 halts and remains in a wait state, as described above. The CPU 120 does not operate until the EEP-NVM 130 completes its operation.

FIG. 6 illustrates a format of a user programming error register included in the NVM controller 160. With reference to FIG. 6, the error register contains a configuration error bit CFGERR, a program error bit PGMERR, and a voltage error bit VTGERR.

The configuration error bit CFGERR is set to logic 1 when more than two of the bits SPGM, OSPGM, SERS and OSERS of the user programming control register of FIG. 5 are set to logic 1 simultaneously. Once the configuration error bit CFGERR has been set to logic 1, the user programming control register cannot be accessed until the bit CFGERR is reset to logic 0.

The program error bit PGMERR is set to logic 1 when a programming data does not coincide with a programmed data in a program operation. The programmed data is internally compared with the programming data directly after the program operation.

The voltage error bit VTGERR is set to logic 1 when operating voltages, such as program voltages and erase voltages of an EEPROM or flash memory, drops below lower limit levels or rises above upper limit levels.

FIG. 7 illustrates a format of a sector protection flag register included in the NVM controller 160 in case the EEP-NVM 130 is an EEPROM or flash memory of 256 Kbytes whose memory cell array is divided into sixteen 2 Kbyte-sectors and seven 32 Kbyte-sectors. With reference to FIG. 7, bits L0–LF are protection flags for the sixteen 2 Kbyte-sectors, and bits U1–U7 are protection flags for the seven 32 Kbyte-sectors. When the respective flag bits are set to logic 1, the corresponding sectors become erase/program-inhibited. Note that the sector protection flag register can be implemented into the EEP-NVM cell array or its peripherals, other than the NVM controller.

Figure 8:
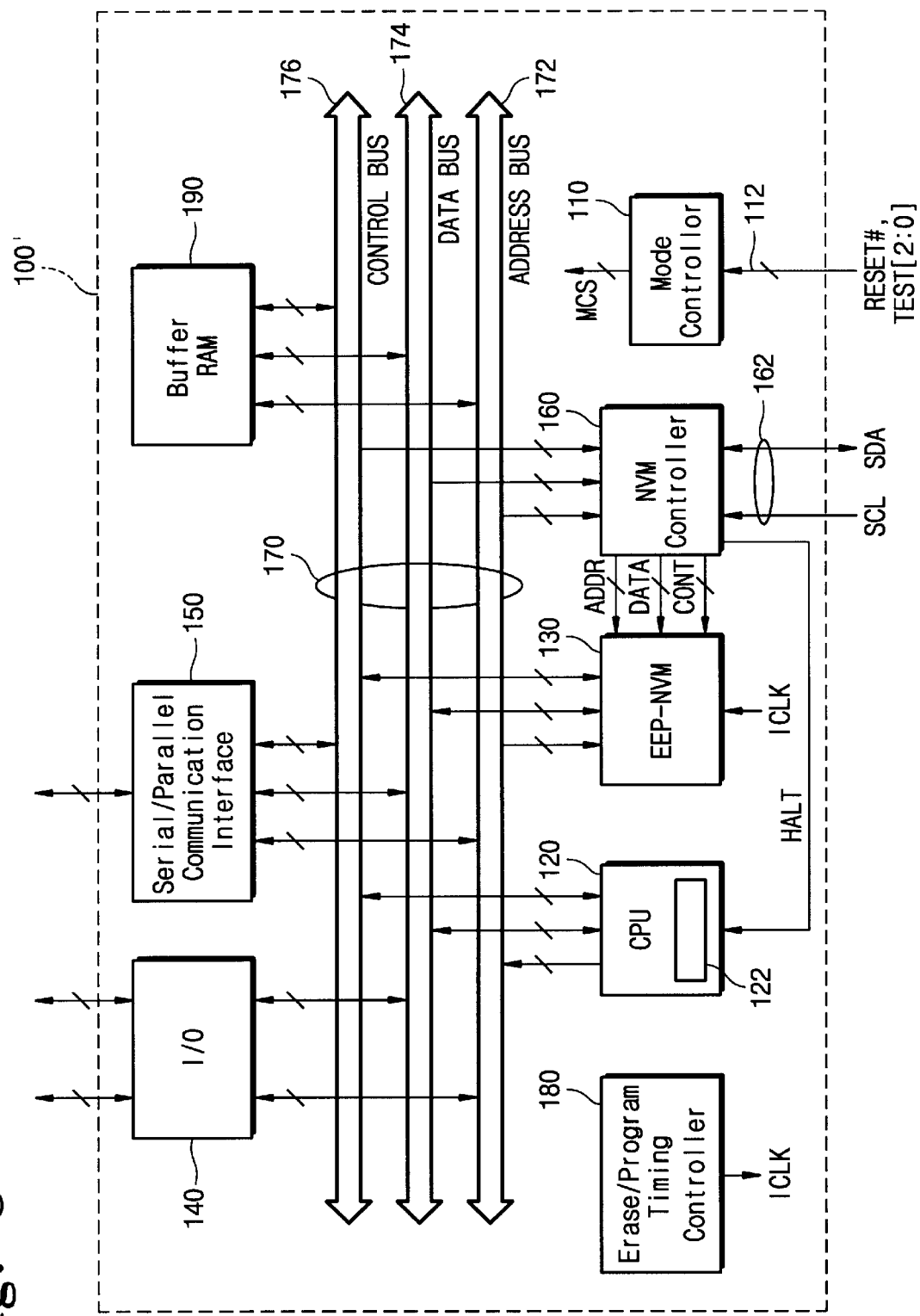
FIG. 8 is a block circuit diagram illustrating another embodiment of the microcontroller according to the present invention.

FIG. 8 illustrates another microcontroller 100' according to a second embodiment of the present invention. As can be seen in FIG. 8, the microcontroller 100' has substantially the same arrangement as that shown in FIG. 1, except that the microcontroller 100' further includes a buffer RAM 190, such as a static RAM (SRAM) or a ferroelectric RAM (FRAM), and I/O ports 140 is shown for usage in lieu of or in addition to communication interface 150. The buffer memory 190 is connected to the buses 170 and can be used to temporarily store data, such as an update program, such as during the user programming mode in which the update program (i.e., a partial control program) is written into the EEP-NVM 130. In this case, the CPU 120 sets the control register circuit 166c of the NVM controller 160 (see FIG. 2), so that the data stored in the buffer memory 190 is written into the EEP-NVM 130 via the NVM controller 160. In addition, the buffer memory 190 is deactivated by the mode controller 110, together with CPU 120, communication interfaces 150, I/O ports 140 and buses 170, in the tool mode where the microcontroller 100 is programmed with a complete set of control programs.

Alternatively, external data is stored into a register file 122 within the CPU 120 temporarily. In this case, the CPU 120 sets the control register circuit 166c of the NVM controller 160 such that the data stored in the register file 122 is written into the EEP-NVM 130 via the NVM controller 160 during for example, the user programming mode.

In still another embodiment of the present invention, external data is stored into a data buffer 134 of the EEP-NVM 130 temporarily (see FIG. 2). The CPU 120 sets the control register circuit 166c of the NVM controller 160 such that the data stored in the data buffer 134 is written into the EEP-NVM 130 via the NVM controller 160 during modes such as the user programming mode.

The remaining operations of the microcontroller of FIG. 8 are the substantially the same as those of the microcontroller of FIG. 1, except the data buffering operation as described above.

According to the embodiments of the present invention, first, a microcontroller is capable of performing an on-board programming operation without any other memories other than a EEP-NVM for storing data or control program. Second, it is possible for a microcontroller to have a constant erase time and a constant program time independent of system environment, and thus preventing overerasure and write disturbance problems. Third, a microcontroller occupies a reduced chip area, thereby lowering manufacturing cost. Fourth, the on-board programming architecture of the invention is applicable to all the microcontrollers with any type of electrically programmable nonvolatile semiconductor memories, irrespective of their performances, that is, the architecture of the invention can apply to either high-end or low-end microcontrollers with electrically programmable nonvolatile semiconductor memories.

In the drawings and specification, there have been disclosed illustrative preferred embodiments of the invention and, although specific terms are employed, they are used in a generic and descriptive sense only and not for purposes of limitation. Numerous modifications and variations of the present invention are possible in light of the above teachings. It is therefore to be understood that, within the scope of the appended claims, the present invention can be practiced in a manner other than as specifically described herein.

What is claimed is:

1. A microcontroller comprising:
   a plurality of buses;
   a central processing unit (CPU) connected to said plurality of buses;
   a system clock input in signal communication with said CPU for receiving a system clock signal;
   a mode controller in signal communication with said CPU for generating mode control signals to set operational modes of said microcontroller in response to a mode selection command;
   at least one bussed communication interface selectively connected to said plurality of buses;
   an electrically rewritable nonvolatile memory (NVM), being the only memory in the microcontroller, for storing data and control program;
   a program/erase timing controller to keep said NVM synchronized at a constant program/erase speed independent of said system clock signal; and
   a memory controller connected to said NVM, including an unbussed serial interface, operatively coupling to either one of said plurality of buses in a second programming mode or to said unbussed serial interface in a first programming mode for receiving an NVM command and at least one of address and data through either one of said at least one bussed communication interface in the second programming mode and said unbussed serial interface in the first programming mode, respectively, in response to the mode control signals.

2. The microcontroller of claim 1, wherein the NVM command indicates an internal operation of said NVM comprising a read operation, a write operation and an erase operation.

3. The microcontroller of claim 2, wherein said NVM controller receives an NVM command and address in either one of the read operation or the erase operation.

4. The microcontroller of claim 2, wherein said NVM controller receives a set of an NVM command, an address and data in the write operation.

5. The microcontroller of claim 1, wherein said CPU is halted and remains in an inactive state during a programming mode wherein said memory controller controls the internal operation of said NVM.

6. The microcontroller of claim 5, wherein said memory controller serially receives the NVM command and said at least one of an address and data from outside of said microcontroller via the serial interface.

7. The microcontroller of claim 5, wherein the received data is a control program set which includes a list of program instructions and program data for programming said microcontroller.

8. The microcontroller of claim 5, wherein said memory controller serially receives a control program set and data, and writes the control program set and data in parallel into said NVM.

9. The microcontroller of claim 1, wherein said CPU receives and decodes an NVM command of an internal operation from said at least one communication interface to write a plurality of control bits of said NVM controller in response to a decoded NVM command.

10. The microcontroller of claim 9, wherein said memory controller halts said CPU in response to the write command provided from said CPU while the update program is being written into said NVM.

11. The microcontroller of claim 9, wherein said serial interface included in said memory controller remains in an inactive state.

12. The microcontroller of claim 9, further comprising at least one of a register file included in said CPU and a data buffer included in said NVM for temporarily storing a control program set and data.

13. The microcontroller of claim 1, said memory controller further comprising a set of control register, address register and data register operatively connected to one of said buses or said serial interface.

14. The microcontroller of claim 13, wherein the control register, address register and data register are coupled to an address bus through an address decoder.

15. The microcontroller of claim 13, said memory controller further comprising a multiplexer for selectively outputting one of an address bus of said buses, and an output of the address register in response to an address selection signal from said control register.

16. The microcontroller of claim 13, said memory controller further comprising a sector protection flag register to prevent false writing into a write-inhibited cell sector.

17. The microcontroller of claim 1, wherein said program/erase timing controller includes a clock generator for generating a program/erase synchronous clock signal independent of a main clock applied to said microcontroller.

18. A microcontroller comprising:
a central processing unit (CPU) connected to a plurality of buses;
a system clock input in signal communication with said CPU for receiving a system clock signal;
a mode controller in signal communication with the CPU for generating mode control signals to set operational modes of said microcontroller in response to a mode selection signal;
a bussed communication interface connected to said plurality of buses for interfacing devices external to the microcontroller;
a memory device in signal communication with the CPU for storing data and control program, said memory device being the only memory in the microcontroller and consisting essentially of an electrically rewritable nonvolatile memory (NVM);
a program/erase timing controller to keep said NVM synchronized at a constant program/erase speed independent of said system clock signal; and
a memory controller connected to said NVM, including an unbussed serial interface, operatively coupling to either one of said plurality of buses in a second programming mode or to said unbussed serial interface in a first programming mode for receiving an NVM command and at least one of address and data through either one of said bussed communication interface in the second programming mode and said unbussed serial interface in the first programming mode, respectively, in response to the mode control signals.

19. The microcontroller of claim 18, wherein said memory controller further includes a serial interface for serially receiving command, data and address for reading from or writing to the memory device without intervention from the CPU.

20. The microcontroller of claim 18, wherein during one programming mode, the CPU moves addresses and data from the communication interface to the memory controller and the memory controller performs a read or write operation with the memory device without intervention from the CPU.

21. A microcontroller comprising:
a central processing unit (CPU) connected to a plurality of buses;
a system clock input in signal communication with said CPU for receiving a system clock signal;
a mode controller for generating mode control signals to set operation modes of said microcontroller in response to a mode selection signal;
a bussed communication interface connected to said plurality of buses for interfacing devices external to the microcontroller;
an electrically rewritable nonvolatile memory (NVM) being the only memory in the microcontroller for storing data and control program;
a program/erase timing controller to keep said NVM synchronized at a constant program/erase speed independent of said system clock signal; and
a memory controller connected to said NVM, including an unbussed serial interface, operatively coupling to either one of said plurality of buses in a second programming mode or to said unbussed serial interface in a first programming mode for receiving an NVM command and at least one of address and data through either one of said bussed communication interface in the second programming mode and said unbussed serial interface in the first programming mode, respectively in response to the mode control signals wherein during one mode of operation, the memory controller directly reads from and writes to the NVM with said data and address without intervention from the CPU.

22. A microcontroller comprising:
a central processing unit (CPU) connected to a plurality of buses;
a system clock input in signal communication with said CPU for receiving a system clock signal;
a mode controller in signal communication with the CPU for generating mode control signals to set operational modes of said microcontroller in response to a mode selection signal;
a bussed communication interface connected to said plurality of buses for interfacing devices external to the microcontroller;
an electrically rewritable nonvolatile memory (NVM), being the only memory in the microcontroller, for storing data and control program;
a program/erase timing controller to keep said NVM synchronized at a constant program/erase speed independent of said system clock signal; and
a memory controller connected to said NVM, including an unbussed serial interface, operatively coupling to either one of said plurality of buses in a second programming mode or to said unbussed serial interface in a first programming mode for receiving an NVM command and at least one of address and data through either one of said bussed communication interface in the second programming mode and said unbussed serial interface in the first programming mode, respectively, in response to the mode control signals, wherein during one mode of operation, the memory controller halts the CPU and directly reads from and writes to the NVM with said data and address.

23. A microcontroller comprising:
a plurality of buses;
a central processing unit (CPU) connected to said plurality of buses;
a mode controller in signal communication with said CPU for generating mode control signals to set operational modes of said microcontroller in response to a mode selection command;
at least one bussed communication interface selectively connected to said plurality of buses;
an electrically rewritable nonvolatile memory (NVM), being the only memory in the microcontroller, for storing data and control program; and
a memory controller connected to said NVM, including an unbussed serial interface, operatively coupling to either one of said plurality of buses in a second programming mode or to said at least one communication unbussed serial interface and in a first programming mode for receiving an NVM command and at least one of address and data through either one of said at least one bussed communication interface in the second programming mode and said unbussed serial interface in the first programming mode, respectively, in response to the mode control signals;
wherein said CPU is halted and remains in an inactive state during an update operation of said NVM, thereby reducing the power consumption of said CPU.

* * * * *